United States Patent
Dockhorn et al.

(10) Patent No.: US 8,897,556 B2
(45) Date of Patent: Nov. 25, 2014

(54) PHOTO CHAPTERS ORGANIZATION

(71) Applicant: Adobe Systems Incorporated, San Jose, CA (US)

(72) Inventors: Carl I. Dockhorn, San Jose, CA (US); Luke A. Rymarz, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 103 days.

(21) Appl. No.: 13/717,422

(22) Filed: Dec. 17, 2012

(65) Prior Publication Data

US 2014/0169702 A1    Jun. 19, 2014

(51) Int. Cl.
G06K 9/00      (2006.01)
G06T 1/00      (2006.01)
G06K 9/36      (2006.01)

(52) U.S. Cl.
CPC .................................. *G06T 1/0007* (2013.01)
USPC .......................................... 382/165; 382/284

(58) Field of Classification Search
USPC ......... 382/162, 164, 165, 167, 172, 224, 284, 382/305; 715/517
See application file for complete search history.

(56) References Cited

U.S. PATENT DOCUMENTS

| | | |
|---|---|---|
| 5,675,358 A | 10/1997 | Bullock et al. |
| 6,282,317 B1 | 8/2001 | Luo et al. |
| 6,538,698 B1 | 3/2003 | Anderson |
| 6,580,437 B1 | 6/2003 | Liou et al. |
| 6,745,186 B1 | 6/2004 | Testa et al. |
| 6,819,783 B2 | 11/2004 | Goldberg et al. |
| 6,834,122 B2 | 12/2004 | Yang et al. |
| 6,915,011 B2 | 7/2005 | Loui et al. |
| 6,928,233 B1 | 8/2005 | Walker et al. |
| 6,950,533 B2 | 9/2005 | Zlotnick |
| 6,956,573 B1 | 10/2005 | Bergen et al. |
| 7,296,224 B2 * | 11/2007 | Atkins et al. ................. 715/227 |
| 7,437,005 B2 | 10/2008 | Drucker et al. |
| 7,580,952 B2 | 8/2009 | Logan et al. |
| 7,694,236 B2 | 4/2010 | Gusmorino et al. |

(Continued)

FOREIGN PATENT DOCUMENTS

| | | |
|---|---|---|
| EP | 1246085 | 10/2002 |
| EP | 1369792 | 12/2003 |

OTHER PUBLICATIONS

"Advisory Action", U.S. Appl. No. 11/394,804, (Apr. 18, 2012), 4 pages.

(Continued)

*Primary Examiner* — Amir Alavi
(74) *Attorney, Agent, or Firm* — Wolfe-SBMC

(57) ABSTRACT

In embodiments of photo chapters organization, a photo analyzer is implemented to receive a set of digital photos, and generate a photo sequence of the digital photos based on a respective timestamp of each photo. The photo sequence includes a first photo based on an earliest timestamp and a last photo based on a latest timestamp. The photo analyzer creates a photo chapter that includes the first photo. To organize the digital photos into photo chapters, the photo analyzer can determine whether a next photo in the photo sequence is to be added to a current photo chapter, and then either adds the next photo to the current photo chapter, or creates a next photo chapter that includes the next photo. The photo analyzer can repeat to organize each next photo in the photo sequence into the photo chapters until the last photo is included in a last photo chapter.

18 Claims, 8 Drawing Sheets

(56) References Cited

U.S. PATENT DOCUMENTS

| | | | |
|---|---|---|---|
| 7,831,599 B2 | 11/2010 | Das et al. | |
| 8,285,111 B2 * | 10/2012 | Otala et al. | 386/241 |
| 8,326,035 B2 * | 12/2012 | Ubillos et al. | 382/167 |
| 8,326,087 B2 | 12/2012 | Perronnin et al. | |
| 8,385,663 B2 | 2/2013 | Xu et al. | |
| 8,488,914 B2 * | 7/2013 | Takayama et al. | 382/305 |
| 8,639,028 B2 | 1/2014 | Spaeth | |
| 2002/0001404 A1 | 1/2002 | Yoshikawa et al. | |
| 2002/0009286 A1 | 1/2002 | Kasutani | |
| 2002/0075322 A1 | 6/2002 | Rosenzweig et al. | |
| 2002/0168108 A1 | 11/2002 | Loui et al. | |
| 2003/0026507 A1 | 2/2003 | Zlotnick | |
| 2003/0059107 A1 | 3/2003 | Sun et al. | |
| 2003/0072486 A1 | 4/2003 | Loui et al. | |
| 2003/0084065 A1 | 5/2003 | Lin et al. | |
| 2003/0123713 A1 | 7/2003 | Geng | |
| 2003/0123737 A1 | 7/2003 | Mojsilovic et al. | |
| 2003/0145279 A1 | 7/2003 | Bourbakis et al. | |
| 2003/0152363 A1 | 8/2003 | Jeannin et al. | |
| 2003/0184653 A1 | 10/2003 | Ohkubo | |
| 2003/0189602 A1 | 10/2003 | Dalton et al. | |
| 2003/0195883 A1 | 10/2003 | Mojsilovic | |
| 2003/0206668 A1 | 11/2003 | Nakajima et al. | |
| 2003/0227468 A1 | 12/2003 | Takeda | |
| 2004/0001631 A1 | 1/2004 | Camara et al. | |
| 2004/0208365 A1 | 10/2004 | Loui et al. | |
| 2004/0228504 A1 | 11/2004 | Chang | |
| 2005/0004690 A1 | 1/2005 | Zhang et al. | |
| 2005/0163378 A1 | 7/2005 | Chen | |
| 2005/0283742 A1 | 12/2005 | Gusmorino et al. | |
| 2006/0026524 A1 | 2/2006 | Ma et al. | |
| 2006/0071942 A1 | 4/2006 | Ubillos et al. | |
| 2006/0071947 A1 | 4/2006 | Ubillos et al. | |
| 2006/0106816 A1 | 5/2006 | Oisel et al. | |
| 2006/0195475 A1 | 8/2006 | Logan et al. | |
| 2006/0214953 A1 | 9/2006 | Crew et al. | |
| 2006/0220986 A1 | 10/2006 | Takabe et al. | |
| 2007/0035551 A1 | 2/2007 | Ubillos | |
| 2007/0088748 A1 | 4/2007 | Matsuzaki et al. | |
| 2007/0201558 A1 | 8/2007 | Xu et al. | |
| 2007/0226255 A1 | 9/2007 | Anderson | |
| 2008/0205772 A1 | 8/2008 | Blose | |
| 2009/0123021 A1 | 5/2009 | Jung et al. | |
| 2009/0150376 A1 | 6/2009 | O'Callaghan et al. | |
| 2009/0161962 A1 | 6/2009 | Gallagher et al. | |
| 2009/0220159 A1 | 9/2009 | Tanaka et al. | |
| 2009/0313267 A1 | 12/2009 | Girgensohn et al. | |
| 2010/0128919 A1 | 5/2010 | Perronnin et al. | |
| 2010/0172551 A1 | 7/2010 | Gilley et al. | |
| 2011/0064317 A1 | 3/2011 | Ubillos | |
| 2012/0082378 A1 | 4/2012 | Peters et al. | |
| 2012/0328190 A1 | 12/2012 | Bercovich et al. | |
| 2013/0121590 A1 | 5/2013 | Yamanaka et al. | |
| 2013/0125002 A1 | 5/2013 | Spaeth | |
| 2014/0101615 A1 | 4/2014 | Spaeth | |
| 2014/0169644 A1 | 6/2014 | Dockhorn | |

OTHER PUBLICATIONS

"Final Office Action", U.S. Appl. No. 11/394,804, (Jan. 31, 2012), 17 pages.

"Final Office Action", U.S. Appl. No. 11/394,804, (Jul. 7, 2010), 17 pages.

"Non-Final Office Action", U.S. Appl. No. 11/394,804, (Apr. 24, 2013), 18 pages.

"Non-Final Office Action", U.S. Appl. No. 11/394,804, (Jan. 7, 2010), 19 pages.

"Non-Final Office Action", U.S. Appl. No. 11/394,804, (Aug. 15, 2011), 19 pages.

"Notice of Allowance", U.S. Appl. No. 11/394,804, (Sep. 24, 2013), 8 pages.

"Restriction Requirement", U.S. Appl. No. 11/394,804, (Aug. 5, 2009), 6 pages.

Cooper, Matthew et al., "Temporal Event Clustering for Digital Photo Collections", *ACM Transactions on Multimedia Computing, Communications and Applications,* vol. 1, No. 3, (Aug. 2005), pp. 269-288.

Graham, Adrian et al., "Time as Essence for Photo Browsing through Personal Digital Libraries", *Proceedings of the 2nd ACM/IEEE-CS Joint Conference on Digital Libraries,* Jul. 13-17, 2002, Portland, OR, USA, (Jul. 13, 2002), pp. 326-335.

Loui, Alexander C., et al., "Automatic Event Clustering and Quality Screening of Consumer Pictures for Digital Albuming", *IEEE Transactions on Multimedia,* vol. 5, No. 3, (Sep. 2003), pp. 390-402.

Platt, John C., "AutoAlbum: Clustering Digital Photographs using Probabilistic Model Merging", *Proceedings of the IEEE Workshop on Content-Based Access of Image and Video Libraries,* (2000), 6 pages.

Platt, John C., et al., "PhotoTOC: Automatic Clustering for Browsing Personal Photographs", *ICICS-PCM;* Singapore, Available at <http://research.microsoft.com/en-us/um/people/jplatt/phototoc-pacrim.pdf>,(Feb. 2002), 5 pages.

Rodden, Kerry et al., "How Do People Manage Their Digital Photographs?", *ACM Press,* (2003), 8 pages.

Rui, Yong et al., "Exploring Video Structure beyond the Shots", *Proceedings of IEEE International Conference on Multimedia Computing and Systems,* (1998), 4 pages.

"Non-Final Office Action", U.S, Appl. No. 13/717,367, Jul. 7, 2014, 12 pages.

\* cited by examiner

PHOTO CHAPTERS ORGANIZATION

BACKGROUND

Many types of devices today include a digital camera that can be used to capture digital photos, such as with a mobile phone, tablet device, a digital camera, and other electronic media devices. The accessibility and ease of use of the many types of devices that include a digital camera makes it quite easy for most anyone to take photos. For example, rather than just having one camera to share between family members on vacation, each of the family members may have a mobile phone and/or another device, such as a digital camera, that can be used to take vacation photos. Additionally, a user with a digital camera device is likely to take many more photos than in days past with film cameras, and the family may come back from vacation with hundreds, or even thousands, of vacation photos.

A large number of photos can be very time-consuming to sort through, organize, and share with others. Typically, a person has to manually sort through the photos, select the ones to share with others, and then email or upload the selected photos to a photo hosting service to share the photos. It may take hours to select the best or most important photos from a large number of photos, and the importance of photos are selected from the viewpoint of the person sharing the photos. It can also be tedious to discern which of the photos will be meaningful to another person. It may take more time still to select and organize the photos for individualized sharing if the person sharing the photos wants to personalize different sets or subsets of the photos to share with different people. Further, most people would not want to receive such a large number of photos from a friend or family member to look through as a slideshow, or even as thumbnail images of the photos.

SUMMARY

This Summary introduces features and concepts of photo chapters organization, which is further described below in the Detailed Description and/or shown in the Figures. This Summary should not be considered to describe essential features of the claimed subject matter, nor used to determine or limit the scope of the claimed subject matter.

Photo chapters organization is described. In embodiments, a photo analyzer is implemented to receive a set of digital photos, and generate a photo sequence of the digital photos based on a respective timestamp of each photo. The photo sequence includes a first photo based on an earliest timestamp and a last photo based on a latest timestamp. The photo analyzer creates a photo chapter that includes the first photo. To organize the digital photos into photo chapters, the photo analyzer can determine whether a next photo in the photo sequence is to be added to a current photo chapter, and then either adds the next photo to the current photo chapter, or creates a next photo chapter that includes the next photo. The photo analyzer can repeat to organize each next photo in the photo sequence into the photo chapters until the last photo is included in a last photo chapter.

In embodiments, the photo analyzer can determine whether the next photo in the photo sequence is to be added to the current photo chapter based on a time gap between a next photo timestamp and a previous photo timestamp. The photo analyzer can then add the next photo to the current photo chapter if the next photo timestamp is within a designated time duration of the previous photo timestamp, or create the next photo chapter to include the next photo if the next photo timestamp is not within the designated time duration of the previous photo timestamp. The number of photo chapters to be created can be established based on a user-designated photo chapters parameter (e.g., such as an input to create five photo chapters), or based on a numerical range to create the photo chapters (e.g., such as an input to create four to six photo chapters).

In embodiments, the photo analyzer can determine that an initial number of photo chapters created is less than a designated number of the photo chapters. The photo analyzer can then decrease the designated time duration, by which to compare the time gap between the previous photo and the next photo to determine whether the next photo is to be added to the current photo chapter, and reorganize the digital photos into the photo chapters again, effective to create more of the photo chapters than the previous number of photo chapters that were created. Alternatively, the photo analyzer can determine that the initial number of photo chapters created is more than the designated number of the photo chapters. The photo analyzer can then increase the designated time duration that is the basis for determining whether the next photo is to be added to the current photo chapter, and reorganize the digital photos into the photo chapters again, effective to create fewer photo chapters than the previous number of photo chapters that were created.

In alternate embodiments of photo chapters organization, the photo analyzer is implemented to receive a set of digital photos, and establish the number of photo chapters within which to organize the set of digital photos. The photo analyzer can determine a minimum number of photos to include in each of the photo chapters based on the number of photo chapters and a quantity of the digital photos. To organize the digital photos into the photo chapters, the photo analyzer can determine a largest time gap between consecutive photos, and determine whether the quantity of photos before the largest time gap meets or exceeds the minimum number of included photos and whether the quantity of photos after the largest time gap meets or exceeds the minimum number of included photos. The photo analyzer can then either create a chapter break at the largest time gap if both the first and second photo quantities exceed the minimum number of included photos, or mark the largest time gap as a non-chapter break if either of the first or second photo quantities is less than the minimum number of included photos. The photo analyzer can repeat to organize the digital photos into the photo chapters until the number of chapter breaks is one less than the established number of photo chapters.

In embodiments, the photo analyzer can generate a photo sequence of the digital photos based on a respective timestamp of each photo, and stack similar photos together based on the respective timestamps of the digital photos being within a designated time duration of each other. When the photo analyzer determines the largest time gap between consecutive photos, a stack of similar photos is evaluated as a single photo having a start timestamp associated with a first photo in the stack and an end timestamp associated with a last photo in the stack. The photo analyzer can also establish a maximum time gap between included photos in a photo chapter. The photo analyzer can determine that a time gap between consecutive included photos in a photo chapter exceeds the established maximum time gap, and then create an additional chapter break at the time gap between the consecutive included photos in the photo chapter.

In embodiments, the photo analyzer can determine a maximum number of photos that should be included in each of the photo chapters, and determine the photo chapters that exceed the maximum number of included photos. The photo analyzer can determine a largest chapter time gap between consecutive included photos in a photo chapter. The photo analyzer can then create a sub-chapter break at the largest chapter time gap if both the photo quantity before the largest chapter time gap meets or exceeds the minimum number of included photos and if the photo quantity after the largest chapter time gap meets or exceeds the minimum number of included photos. Additionally, the photo analyzer can determine a sub-chapter of a photo chapter that exceeds the maximum number of included photos, and determine a largest sub-chapter time gap between consecutive sub-chapter included photos. The photo analyzer can then create an additional sub-chapter break at the largest sub-chapter time gap if both the photo quantities before and after the largest sub-chapter time gap meets or exceeds the minimum number of included photos.

BRIEF DESCRIPTION OF THE DRAWINGS

Embodiments of photo chapters organization are described with reference to the following Figures. The same numbers may be used throughout to reference like features and components that are shown in the Figures.

DETAILED DESCRIPTION

Embodiments of photo chapters organization are described, and a photo analyzer is implemented to analyze and organize a large number of digital photos into photo chapters. A user can then share the large number of photos without having to take the time to organize them, but still offer an enjoyable experience for a viewer with whom the photos are shared. The photos can be organized and displayed in chapters, and a viewer will be able to see the relevant photos even if only a small subset of the photos are viewed. Often, a set of photos shared by a user tells a story, and when viewing a large set of photos, it can be difficult for a viewer to identify the chapters within the story. Having the photos automatically organized into photo chapters makes it easier for a viewer to discern the story.

A set of digital photos can be automatically organized into a chronological hierarchical structure of the photo chapters and sub-chapters based on the time the photos are taken and based on the gaps in time between the photos. The photos are organized into the photo chapters and sub-chapters based on the photos that are taken at around the same time. The end of one photo chapter and the beginning of the next is based on the detection of larger gaps of time between the photos. The photo chapters and sub-chapters of the photos also facilitate other activities, such as browsing, searching, summarization, organizing, reviewing, or other activities that benefit from materials being organized and grouped by time.

The photo analyzer implements embodiments of photo chapters organization so that a user can quickly share a large number of photos with viewers, who are also more likely to enjoy the photo viewing experience of being able to see as few as a small subset of the organized, relevant photos, yet have the option to view more of the photos that may be relevant to a viewer. Although described with reference to digital photos that have associated timestamp data, the techniques described herein for photo chapter organization can be applied to organize any type of timestamped media content into media chapters.

While features and concepts of photo chapters organization can be implemented in any number of different devices, systems, networks, environments, and/or configurations, embodiments of photo chapters organization are described in the context of the following example devices, systems, and methods.

Figure 1:
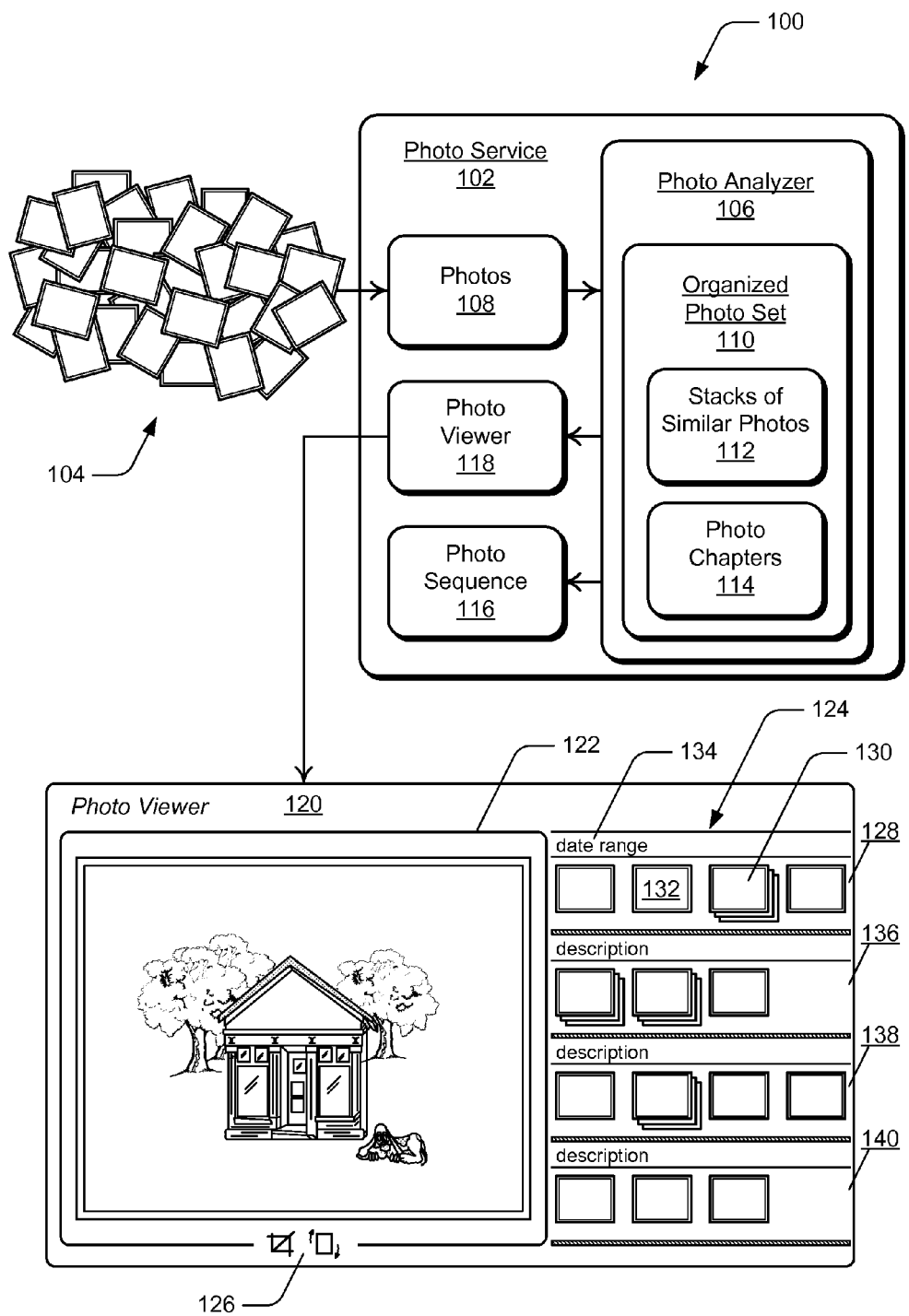
FIG. 1 illustrates an example of photo chapters organization in accordance with one or more embodiments.

FIG. 1 illustrates an example 100 of photo chapters organization in accordance with one or more embodiments. The example 100 includes a photo service 102, such as a network service that a user can access via a client device, to organize a large group of photos 104 that are uploaded to the photo service. The photos described herein are digital photos that include image content. A photo "taken" generally refers to a user composing and taking a photo with a digital camera device, whereas a photo "captured" generally refers to the processing performed by the digital camera device to image the photo that the user has taken. The digital photos can also include associated metadata of the photos, such as exchangeable image file format (EXIF) photo data that includes a timestamp (e.g., date and time), and location data corresponding to when and where a photo is taken or captured.

The photo service 102 includes a photo analyzer 106 that can be implemented as a software application for photo analysis to organize and determine photo chapters given a set of photos 108. The photo analyzer 106 can be maintained at the photo service 102 as executable instructions that are stored on computer-readable storage media, such as any suitable memory device or electronic data storage. Additionally, the photo analyzer can be executed with a processing system at the photo service to implement embodiments of photo chapters organization. Further, the photo service can be implemented with various components, such as a processing system and memory, as well as any number and combination of differing components as further described with reference to the example device shown in FIG. 8.

A user of the photo service 102 can select the group of photos 104 that are uploaded as the set of photos 108 to be analyzed by the photo analyzer 106 for photo chapters organization and shared with others, who are referred to herein as the viewers of the shared, organized photos. The user who selects the photos to be analyzed and shared may also be referred to as the photo owner of the set of photos. Generally, the user's group of photos 104 may include hundreds, or even thousands, of digital photos that would be particularly time-consuming for the user to sort through and organize for sharing. However, the techniques described for photo chapters organization may also be implemented for a relatively small set of digital photos.

Rather than manually selecting individual photos, the user can select the digital photos to include in the shared group of photos 104 based on a date range that encompasses the group of photos, such as in a calendar view that indicates the number of photos within a date range, or that displays thumbnail images associated with calendar dates. For example, the user may simply select the first through the end of a month to share all of the photos that were taken during the month. The user may also select one photo from the group of photos to represent the entire set of selected photos for sharing. Although not needed to utilize the photo analyzer 106 at the photo service 102, the user may also pre-sort larger subgroups of the photos, such as by people, places, or events before initiating the photo analyzer.

Additionally, the user may select the viewers with whom to share the selected group of photos 104 from an address book, contacts list, social network site, and the like. The photo service 102 can receive a list of user-selected viewers from a user, such as via a user client device, and communicate invitations to view an organized photo set 110 based on viewer contact information, such as in an email or text message. The photo service can then distribute the organized photo set to a viewer client device when a viewer accepts an invitation and/or requests the photos for display and viewing at the client device.

In embodiments, the photo analyzer 106 is implemented to generate the organized photo set 110 from the set of photos 108, and the organized photo set can include stacks of similar photos 112 and/or photo chapters 114. In implementations, the photo analyzer first determines the similar photos in the entire set of photos to create the stacks of similar photos, and then organizes the stacked photos and non-stacked photos into the photo chapters. The photo chapters can be organized without allocating a stack of similar photos to more than one chapter (e.g., the similar photos in a stack are maintained together in a single photo chapter). In alternate implementations, the photo analyzer first organizes the set of photos into the photo chapters, and then determines similar photos within each chapter to create the stacks of similar photos in each respective photo chapter.

A photo chapter may include sub-chapters to further organize the photos in the chapter, and the photo chapter and sub-chapters may include the stacks of similar photos. In implementations, the photo chapters 114 are the top level of the photo organization, the stacks of similar photos 112 are the bottom level, and the sub-chapters are the one or more multiple levels in between. For example, the photos from a family vacation to Europe may be organized into a photo chapter that includes all of the photos taken in France. A sub-chapter may include the photos taken in Paris with a further sub-chapter that includes the photos of the Notre Dame Cathedral, and then a stack of similar photos, such as several photos of a particular architectural feature of the Cathedral.

The photo analyzer 106 can organize the set of photos 108 into a chronological, hierarchical structure of the photo chapters 114 (to include the sub-chapters), where each photo chapter includes a subset of the digital photos. The photo chapters can be organized based on a respective timestamp of each photo and the time gaps between the subsets of the photos. The end of one photo chapter and the beginning of a next photo chapter can be based on the detection of larger gaps of time between the photos, or collectively, the stacks of similar photos. The photo chapters can also be based on the number of photos in the set of photos 108 and/or based on a user selected target number of chapters. For example, the user may simply select a date range from the first through the end of a month to share all of the photos that were taken during the month. The user may then designate four photo chapters that correspond to a sequence of events during the selected month, such as a family vacation that includes photos taken over several days, a birthday party, and a couple of the kids' sporting events.

In embodiments, the photo analyzer 106 can implement various algorithms to organize the set of digital photos 108. In a first algorithm, the photo analyzer can establish photo chapters parameters by which to group the photos, such as based on a time gap between photos, a user-designated number of photo chapters to create (e.g., such as an input to create five photo chapters), a numerical range of the photo chapters to create (e.g., such as an input to create four to six photo chapters), and/or a calculated number of the photo chapters that is determined based on the quantity of the digital photos. The photo analyzer can then generate a photo sequence 116 of the digital photos based on the respective timestamps of each photo to sort them by date and time, where the photo sequence includes a first photo based on an earliest timestamp and a last photo based on a latest timestamp.

The photo analyzer 106 can then create a first photo chapter and include the first photo from the photo sequence 116 in the first photo chapter. The digital photos 108 are then sequentially organized into the photo chapters 114 (also referred to as sequential photo chaptering). The photo analyzer can determine whether the next photo in the photo sequence is to be added in the first photo chapter based on the time gap between the previous photo and the next photo, such as determined from the respective timestamps of the photos. The photo analyzer can then add the next photo to the current photo chapter if the next photo timestamp is within a designated time duration of the previous photo timestamp, or create the next photo chapter to include the next photo if the next photo timestamp is not within the designated time duration of the previous photo timestamp. For each subsequent photo in the photo sequence, this is repeated. If the next photo is within the designated time duration of the previous photo, then the photo is added to the current photo chapter, otherwise a new photo chapter is created and the photo is included in the new photo chapter.

When all of the photos 108 in the photo sequence 116 have been included in a photo chapter 114, the photo analyzer 106 can determine whether too many or not enough photo chapters have been created. For example, the photo analyzer can determine that the number of the photo chapters created is less than a designated number of the photo chapters (e.g., not enough photo chapters have been created). The designated time duration, by which to compare the time gap between the previous photo and the next photo, can then be decreased, effective to create more of the photo chapters than the previous number of photo chapters that were created. The designated time duration identifies the maximum allowable time gap between a previous photo and a next photo, and can be utilized as the basis for determining whether the next photo is to be added to the current photo chapter or added to a next photo chapter. The photo analyzer can then reorganize the digital photos into the photo chapters again, which will likely create more of the photo chapters.

Similarly, the photo analyzer 106 can determine that the number of the photo chapters created is more than the designated number of the photo chapters (e.g., too many photo chapters 114 have been created). The designated time duration, by which to compare the time gap between the previous photo and the next photo, can then be increased, effective to create fewer photo chapters than the previous number of the photo chapters that were created. The photo analyzer can then reorganize the digital photos into the photo chapters again, which will likely create fewer photo chapters. The photo analyzer can continue the first algorithm process until the desired number of photo chapters is created, or until modifying the time duration yields no better results. If the desired number of photo chapters is not generated, the photo analyzer may also determine whether the nearest larger or smaller number of photo chapters will suffice and proceed with photo chapters organization based on the revised number of photo chapters.

The photo analyzer 106 can also be implemented to refine the first algorithm process for photo chapters organization of the set of digital photos 108. For each of the photo chapters 114 that are created, the photo analyzer can determine that a photo chapter may not include at least a minimum number of photos, such as if a photo chapter only contains a single photo or a relatively small number of photos. The single or small number of photos can then be added as a sub-chapter to a previous photo chapter or to the next photo chapter, such as based on the shortest time gap between the single photo and the last photo in the previous photo chapter or the first photo in the next photo chapter.

Similarly, for each of the photo chapters 114, the photo analyzer 106 can determine that a photo chapter includes a relatively large number of photos, and repeat the first algorithm process within the photo chapter to create sub-chapters of included photos within the photo chapter. A sub-chapter can be created based on the included photos that have respective timestamps within a designated time duration of each other, such as photos that may have been taken within thirty minutes, or five minutes, of each other. Additionally, sub-sub-chapters may be created, such as based on the included photos that have respective timestamps within one minute or less of each other. Alternatively, a user may designate that any photo chapter which includes more than a set number of photos be broken into sub-chapters.

In embodiments, the photo analyzer 106 is also implemented to determine the stacks of similar photos 112 in each of the photo chapters 114 based on the photos 108 that are nearly duplicate images of the same subject, such as photos that are often taken in relatively quick succession and/or in the same location. For example, a user may want to take three or four photos of a group of people in the hopes that everyone in the photo will be smiling and looking at the camera in at least one of the photos. Similarly, a user may take several photos of particular subject, such as a sunset, over several minutes to capture the one ideal sunset photo. If several photos are taken a few seconds apart or at the same location, then one of the photos is likely relevant. Additionally, photos of the same person or group of people can be stacked to avoid initially displaying more than one photo of the same person or group.

The photo analyzer 106 can also analyze the image content of each digital photo 108 in a photo chapter and determine the similar photos based on the image content and metadata (e.g., the respective timestamps) of the photos. The photo analyzer can then create the stacks of similar photos 112 in the photo chapters 114 from these determined similar photos. The photo image content of each digital photo that is analyzed can include object recognition, facial recognition if a photo includes one or more faces of people, the number of faces in a photo, and/or facial composition, such as to detect for open eyes, smiles, and mouths closed (e.g., other than the smiles). The photo image content can also be analyzed for image focus (e.g., whether a photo is blurry or sharp), colors and lighting, and other environment factors, such as the relative horizon level of the image content in a photo.

As noted above, the photo analyzer 106 can implement various algorithms to organize the set of digital photos 108. In a second algorithm (also referred to as largest time gap detection), the digital photos 108 are organized based on the largest time gaps between consecutive photos in the photo sequence 116. The photo analyzer can establish the photo chapters parameters by which to group the photos, such as based on a user-designated number of photo chapters to create (e.g., such as an input to create five photo chapters), a numerical range of the photo chapters to create (e.g., such as an input to create four to six photo chapters), and/or a calculated number of the photo chapters that is determined based on the quantity of the digital photos. The photo analyzer can also set a minimum number of the photos to include in each of the photo chapters, as well as a maximum number of the photos to include in each of the photo chapters that have no sub-chapters.

The photo analyzer 106 can then generate the photo sequence 116 of the digital photos based on the respective timestamps of each photo to sort them by date and time, where the photo sequence includes the first photo based on the earliest timestamp and the last photo based on the latest timestamp. The photo analyzer can also create the stacks of similar photos 112 based on the photos that are determined to be similar, such as photos that are taken over a short period of time of the same subject and from the same perspective. For example, photos can be determined similar based on respective timestamps of the photos within a designated time duration of each other, such as photos that may have been taken within a few seconds of each other. The photo analyzer 106 is implemented to then determine the largest time gaps between consecutive photos in the photo sequence 116. When the photo analyzer determines the largest time gap between consecutive photos, a stack of similar photos is evaluated as a single photo having a start timestamp associated with a first photo in the stack and an end timestamp associated with a last photo in the stack.

The photo analyzer 106 determines the largest time gap between consecutive photos in the photo sequence 116, and then determines whether photo quantities before and after the largest time gap meets or exceeds the minimum number of photos to include in each of the photo chapters. If the photo quantities before and after the largest time gap meets or exceeds the minimum number of included photos, then the photo analyzer can create a photo chapter break at the determined largest time gap between the consecutive photos. Alternatively, the photo analyzer can mark the largest time gap between consecutive photos as a non-chapter break if the photo quantities before and after the largest time gap do not exceed the minimum number of photos to include in the photo chapters.

The photo analyzer 106 can repeat the algorithm to determine the next largest time gap between photos in the photo sequence 116. Similarly, the photo analyzer can determine whether the quantity of photos before the next largest time gap and the nearest preceding chapter break meets or exceeds the minimum number of photos to include in each of the photo chapters, as well as determine whether the quantity of photos after the next largest time gap meets or exceeds the minimum number of included photos. If the photo quantities before and after the next largest time gap meets or exceeds the minimum number of included photos, then the photo analyzer can create another photo chapter break. This can be repeated until the number of chapter breaks is one less than the established or desired number of the photo chapters. For example, five chapter breaks will separate the set of digital photos 108 into six photo chapters.

The photo analyzer 106 can then determine any of the photo chapters, as delineated by the chapter breaks, that exceed the maximum number of photos to be included in a photo chapter. If a photo chapter exceeds the maximum number of included photos, then the photo analyzer can repeat the second algorithm within a photo chapter to determine the largest time gap between photos that are included in the photo chapter. The photo analyzer can then create a sub-chapter break at the largest time gap if the sub-chapter break will result in sub-chapters that meet the minimum number of included photos determination. The second algorithm can also be recursively applied for any sub-chapter that still exceeds the maximum number of included photos.

The photo analyzer 106 may also implement a third algorithm for a maximum allowable time gap between consecutive photos that are included in a photo chapter 114 (also referred to as maximum in-chapter time gap). The photo analyzer can determine whether a time gap between consecutive included photos in a photo chapter exceeds an established maximum time gap. If a time gap between photos in a photo chapter is determined that exceeds the maximum allowable time gap, the photo analyzer can create an additional chapter break at the time gap in the photo chapter.

In this example 100 of photo chapters organization, the photo service 102 includes a photo viewer 118 that supports displaying the photos for viewing, such as when downloaded to a client device. The photo viewer can be implemented as a software application and maintained at the photo service as executable instructions that are stored on computer-readable storage media. The photo service can provide the photo viewer, along with the organized photo set 110, to a viewer client device when a viewer requests the photos for display and viewing. The photo viewer includes a photo viewer interface 120 to display the digital photos in the organized photo set.

The photo viewer interface 120 has a photo display region 122 and a photo chapters region 124. The photo viewer interface may also include any type of user-selectable photo edit controls 126, or other types of user interface function controls, such as to share or annotate the photos. The organized photo set 110 is displayed segmented by the photo chapters with the most relevant photos displayed at the beginning of each chapter, where a chapter includes non-stacked photos and stacks of similar photos with a representative photo of the stack displayed on top. In this example, the organized photo set 110 includes four photo chapters 114, which are displayed in the photo chapters region 124 of the photo viewer interface. A first photo chapter 128 includes a stack of similar photos 130, as well as several non-stacked photos 132 that are displayed as thumbnail images.

A viewer can select any of the thumbnail images that are displayed in the photo chapters region 124 to display a selected photo in the photo display region 122 of the photo viewer interface 120. A viewer can also easily navigate between the photo chapters and view as many or as few of the photos in each chapter, and the viewer will be able to see the relevant photos even if only a small subset of the photos are viewed. A viewer may also create his or her own collection of photos from the organized photo set. For example, a viewer may select a couple of the photo chapters and then initiate the photo analyzer 106 at the photo service 102 to reorganize the photos based on just the photos that are included in the selected chapters.

The photo chapters in the photo chapters region 124 of the photo viewer interface 120 also include an associated chapter identifier, such as the chapter identifier 134 that is associated with the first photo chapter 128. The chapter identifiers initially default to dates and times based on the earliest photo that is included in a chapter. However, a user may change a chapter identifier to a text description that identifies the subset of photos in a particular chapter. For example, the chapter identifier 134 of the first photo chapter may be displayed as a date range, whereas the chapter identifier of a second photo chapter 136 is displayed as a text description of the chapter. Similarly, the chapter identifiers associated with each of a third photo chapter 138 and a fourth photo chapter 140 are displayed as a text description of the respective chapters.

Figure 2:
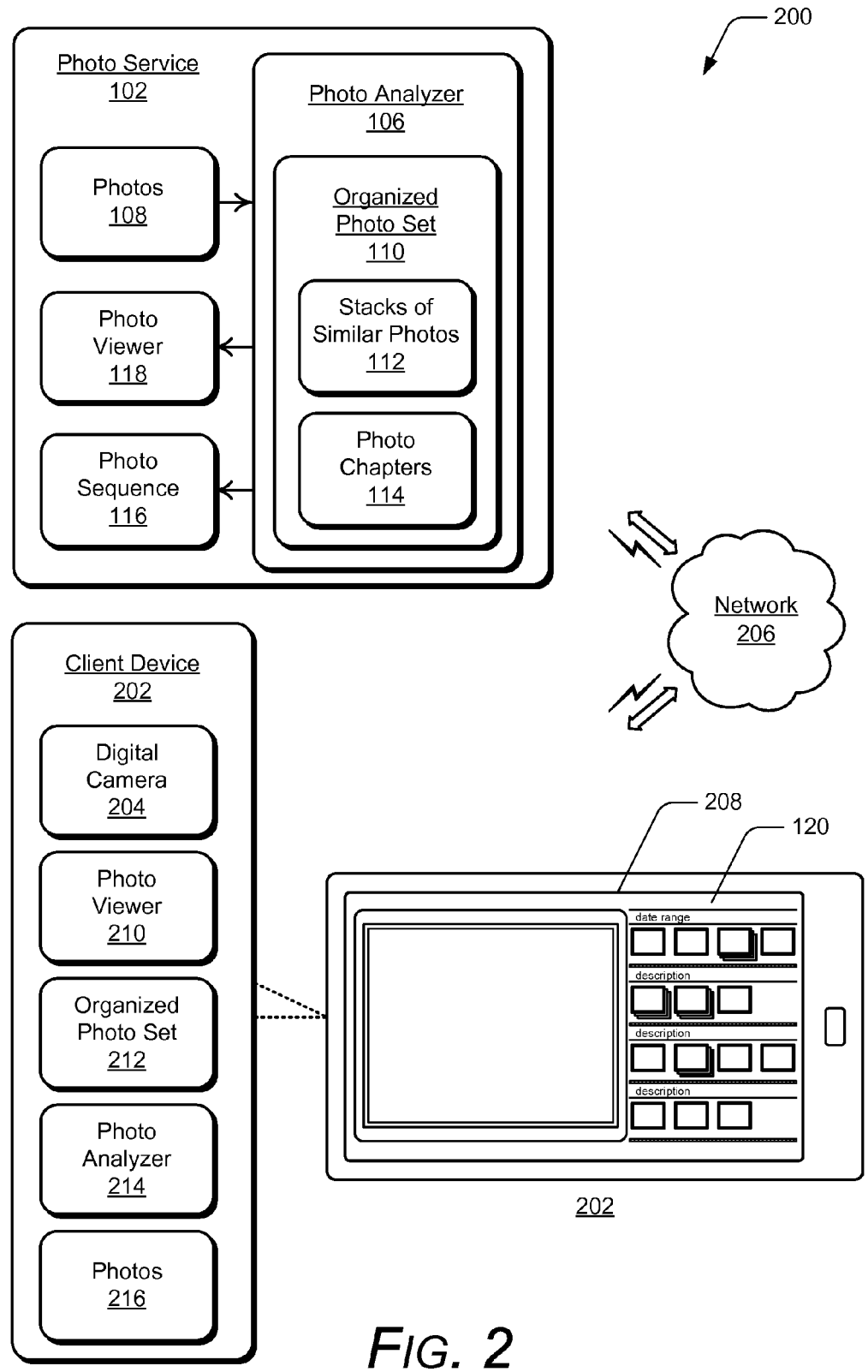
FIG. 2 illustrates an example system in which embodiments of photo chapters organization can be implemented.

FIG. 2 illustrates an example system 200 in which embodiments of photo chapters organization can be implemented. The system 200 includes the photo service 102 as described with reference to FIG. 1. The example system 200 also includes an example client device 202 in which embodiments of photo chapters organization can be implemented. The example client device may be any one or combination of a wired or wireless device, such as a mobile phone, tablet, computing, communication, entertainment, gaming, media playback, and/or other type of device. Any of the devices can be implemented with various components, such as a processing system and memory, an integrated digital camera 204 to capture digital photos, and any number and combination of differing components as further described with reference to the example device shown in FIG. 8.

Any of the devices and services described herein can communicate via a network 206, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

In this example, the client device 202 includes an integrated display device 208 to display the photo viewer interface 120 as described with reference to FIG. 1. The client device 202 may receive the photo viewer 118 from the photo service 102, or include a standalone photo viewer 210 that supports displaying the photos. The photo service 102 can communicate the organized photo set 110 to the client device 202, which maintains a version of the organized photo set 212 for viewing.

The client device 202 may implement a component or module of the photo analyzer 106 and/or can implement a standalone version of the photo analyzer 214 to implement embodiments of photo chapters organization as described with reference to the photo analyzer 106 at the photo service 102. For example, a user of the client device 202 may want to organize a set of photos 216 that are maintained on the device, and the user can initiate the photo analyzer 214 to organize a given set of photos into photo chapters and sub-chapters.

Figure 3:
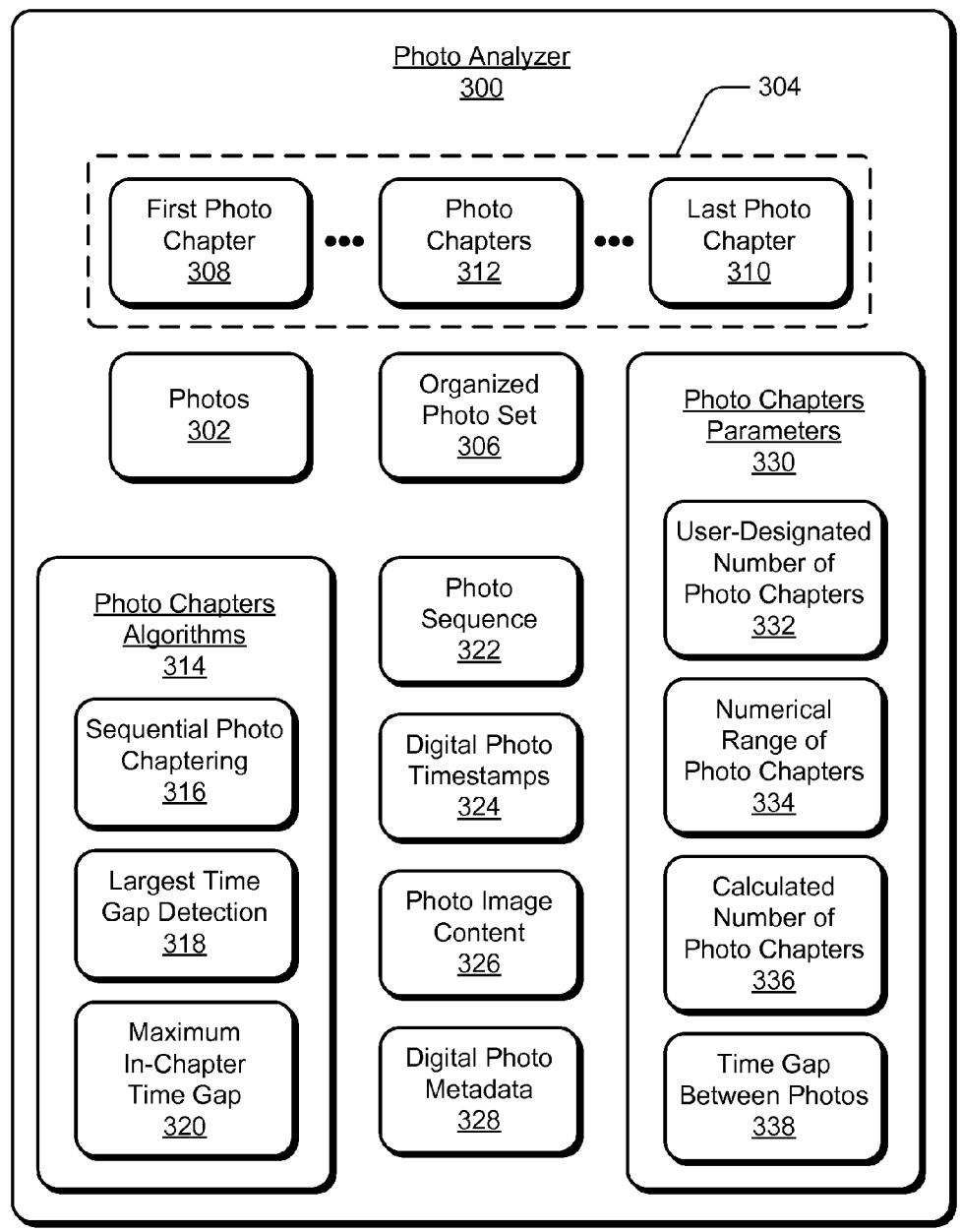
FIG. 3 illustrates an example photo analyzer that can implement photo chapters organization in accordance with one or more embodiments.

FIG. 3 illustrates an example photo analyzer 300 as described with reference to FIGS. 1 and 2, such as the photo analyzer 106 implemented at the photo service 102 and/or the photo analyzer 214 implemented by the client device 202. As described, the photo analyzer 300 receives a set of digital photos 302 for photo analysis, and can then organize the photos into photo chapters 304 to generate an organized photo set 306. As the photo chapters 304 are created, the photo chapters include a first photo chapter 308, a last photo chapter 310, and any number of photo chapters 312 in between. The photo analyzer can utilize various photo chapters algorithms 314 to implement photo chapters organization, such as sequential photo chaptering 316, largest time gap detection 318, and/or maximum in-chapter time gap 320 as described with reference to FIG. 1. Any one or more of the photo chapters algorithms may be implemented independently or together for photo chapters organization. Alternatively or in addition, other algorithms for photo chapters organization may be implemented by the photo analyzer.

The photo analyzer 300 can generate a photo sequence 322 of the digital photos 302, such as based on digital photo timestamps 324 (e.g., date and time). The photo analyzer can also analyze the digital photos 302 based on photo image content 326 and/or digital photo metadata 328. The photo analyzer 300 also includes the photo chapters parameters 330 by which to group the digital photos 302 into the photo chapters 304, as described with reference to FIG. 1. In this example, the photo chapters parameters include a user-designated number 332 of photo chapters to create (e.g., such as an input to create five photo chapters), a numerical range 334 of the photo chapters to create (e.g., such as an input to create four to six photo chapters), a calculated number 336 of the photo chapters that is determined based on the quantity of the digital photos, and/or a time gap between photos parameter 338.

Example methods 400, 500, 600, and 700 are described with reference to respective FIGS. 4-7 in accordance with one or more embodiments of photo chapters organization. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage media that is local and/or remote to a computer processing system, and implementations can include software applications, programs, functions, and the like.

Figure 4:
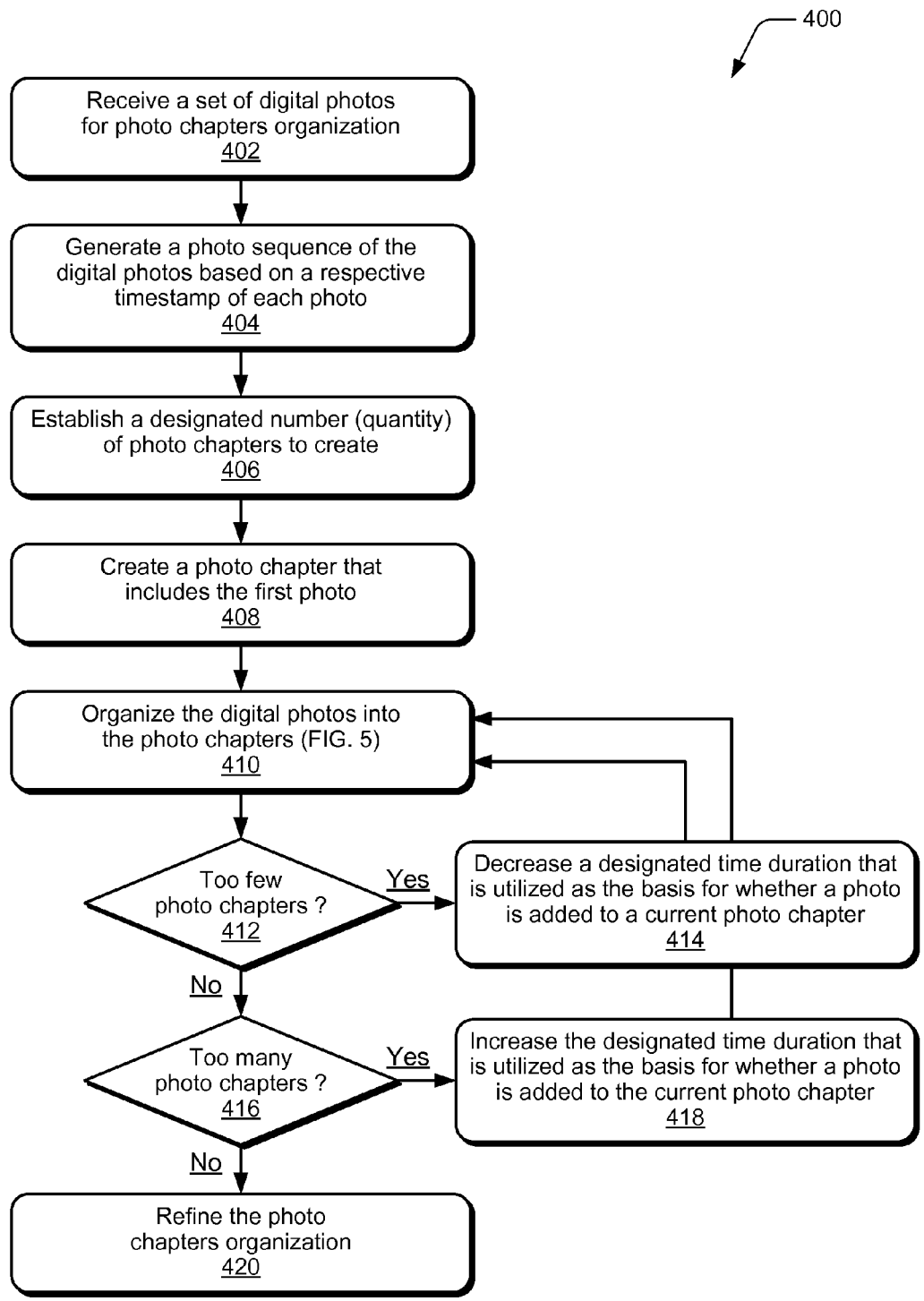
FIG. 4 illustrates example method(s) of photo chapters organization in accordance with one or more embodiments.

FIG. 4 illustrates example method(s) 400 of photo chapters organization, and is generally described with reference to a photo analyzer. The order in which the method is described is not intended to be construed as a limitation, and any number or combination of the method operations can be combined in any order to implement a method, or an alternate method.

At 402, a set of digital photos are received for photo chapters organization. For example, the photo analyzer 106 at the photo service 102 (FIG. 1) receives the set of digital photos 108 to analyze for photo chapters organization. Similarly, the client device 202 (FIG. 2) implements the photo analyzer 214 to perform any of the method operations described herein with reference to the photo analyzer 106 at the photo service 102.

At 404, a photo sequence of the digital photos is generated based on a respective timestamp of each photo. For example, the photo analyzer 106 at the photo service 102 generates the photo sequence 116 of the digital photos 108 based on the respective timestamps 324 (FIG. 3) for each photo to sort them by date and time, and the photo sequence includes a first photo based on an earliest timestamp and a last photo based on a latest timestamp.

At 406, a designated number (e.g., quantity) of photo chapters to create is established. For example, the photo analyzer 106 at the photo service 102 establishes the designated number of photo chapters to create, which can be based on the user-designated number 332 of photo chapters (e.g., a photo chapters parameter), based on the numerical range 334 of photo chapters, the calculated number 336 of photo chapters that is determined based on the quantity of the digital photos, and/or the time gap between photos parameter 338.

At 408, a photo chapter is created that includes the first photo. For example, the photo analyzer 106 at the photo service 102 creates the first photo chapter 308 and adds the first photo from the photo sequence 116 to the first photo chapter. At 410, the digital photos are organized into the photo chapters. For example, the photo analyzer 106 at the photo service 102 organizes the digital photos into the photo chapters 114 as described with reference to FIG. 5 until all of the photos in the photo sequence 116 from the set of digital photos 108 are included in a photo chapter.

At 412, a determination is made as to whether the number of photo chapters created is less than the designated number of photo chapters. For example, the photo analyzer 106 at the photo service 102 determines whether the number of photo chapters created when the digital photos are organized is less than the designated number (e.g., quantity) of photo chapters (established at 406).

If the number of photo chapters created is less than the designated number of photo chapters, or not enough photo chapters have been created (i.e., "yes" from 412), then at 414, a designated time duration that is utilized as a basis for determining whether a photo is to be added to the current photo chapter is decreased. For example, the photo analyzer 106 at the photo service 102 decreases the designated time duration, effective to create more of the photo chapters than a previous number of photo chapters, as described with reference to FIG. 5.

The designated time duration identifies a maximum allowable time gap between a previous photo and a next photo, to determine whether the next photo in the photo sequence is to be added to a current photo chapter or added to a new photo chapter. The time gap between when the previous photo was taken and when the current photo was taken may be a short time duration, in which case the photo may be added to the current photo chapter. Alternatively, the time gap between when the previous photo was taken and when the next photo was taken may be a longer time duration, in which case the photo may be added to a new photo chapter. This is further described with reference to FIG. 5 to organize the digital photos into the photo chapters. The method then continues at 410 to reorganize the digital photos into the photo chapters again.

If the number of photo chapters created is not less than the designated number of photo chapters (i.e., "no" from 412), then at 416, a determination is made as to whether the number of photo chapters created is more than the designated number of photo chapters. For example, the photo analyzer 106 at the photo service 102 determines whether the number of photo chapters created when the digital photos are organized is more than the designated number (e.g., quantity) of photo chapters established at 406.

If the number of photo chapters created is more than the designated number of photo chapters, or too many photo chapters have been created (i.e., "yes" from 416), then at 418, the designated time duration that is utilized as the basis for determining whether a photo is to be added to the current photo chapter is increased. For example, the photo analyzer 106 at the photo service 102 increases the designated time duration, effective to create fewer photo chapters than a previous number of photo chapters, as described with reference to FIG. 5. The method then continues at 410 to reorganize the digital photos into the photo chapters again.

If the number of photo chapters created is not more than the designated number of photo chapters (i.e., no from 416), then at 420, the photo chapters organization is refined. For example, the photo analyzer 106 at the photo service 102 refines the photo chapters organization of the set of digital photos 108, such as for photo chapters 114 that do not include at least a minimum number of photos and/or for photo chapters that include a relatively large number of photos. The photo analyzer can repeat the algorithm process within a photo chapter to create sub-chapters of included photos within a photo chapter. The photo analyzer can also determine similar photos in a photo chapter based on the image content and metadata of the photos, and create the stacks of similar photos 112 in each of the photo chapters.

Figure 5:
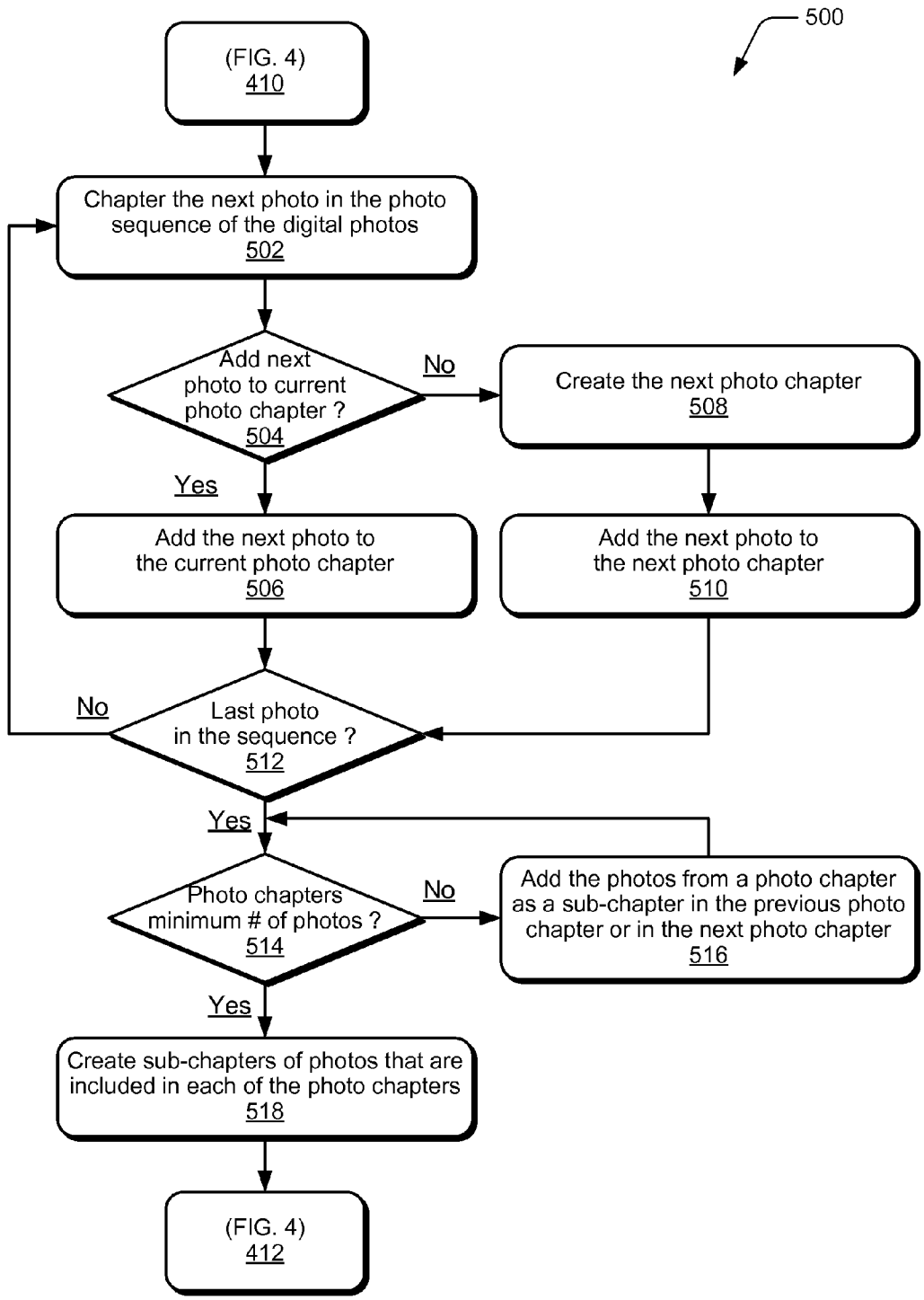
FIG. 5 further illustrates the example method(s) of FIG. 4 for photo chapters organization in accordance with one or more embodiments.

FIG. 5 illustrates example method(s) 500 of photo chapters organization, and is generally described with reference to a photo analyzer. The order in which the method is described is not intended to be construed as a limitation, and any number or combination of the method operations can be combined in any order to implement a method, or an alternate method.

At 502, the next photo in the photo sequence of the digital photos is chaptered. For example, the photo analyzer 106 at the photo service 102 (FIG. 1) sequences through each of the digital photos 108 to organize the photos into the photo chapters 114 (as referred to at 410 in FIG. 4). Similarly, the client device 202 (FIG. 2) implements the photo analyzer 214 to perform any of the method operations described herein with reference to the photo analyzer 106 at the photo service 102.

At 504, a determination is made as to whether the next photo in the photo sequence of the digital photos is to be added to a current photo chapter. For example, the photo analyzer 106 at the photo service 102 determines whether the next photo in the photo sequence 116 is to be added to a current photo chapter based on a time gap between a next photo timestamp and a previous photo timestamp. The time gap between when the previous photo was taken and when the next photo that is being chaptered was taken may be a short time duration, in which case the photo may be added to the current photo chapter. Alternatively, the time gap between when the previous photo was taken and when the next photo was taken may be a longer time duration, in which case the photo may be added to a new photo chapter. The time gap between when the photos are taken can be compared to a designated time duration that identifies a maximum allowable time gap between a previous photo and a next photo, and can be utilized as the basis for determining whether the next photo is to be added to the current photo chapter or added to a new photo chapter.

If the next photo is determined to be added to the current photo chapter based on the time gap between the photo timestamps (i.e., "yes" from 504), then at 506, the next photo is added to the current photo chapter. For example, the photo analyzer 106 at the photo service 102 adds the next photo to the current photo chapter if the next photo timestamp is within a designated time duration of the previous photo timestamp. If the next photo is determined not to be added to the current photo chapter based on the time gap between the photo timestamps (i.e., "no" from 504), then at 508, the next photo chapter is created and, at 510, the next photo is added to the next photo chapter. For example, the photo analyzer 106 at the photo service 102 creates the next photo chapter and adds the next photo to the created next photo chapter if the next photo timestamp is not within the designated time duration of the previous photo timestamp.

Continuing from the photo being added to the current photo chapter (at 506), or the photo being added to the next photo chapter (at 510), a determination is made at 512 as to whether the last photo in the photo sequence of digital photos has been included in a photo chapter. For example, the photo analyzer 106 at the photo service 102 determines whether the last photo in the photo sequence 116 of the digital photos 108 has been included in a photo chapter. If the last photo in the photo sequence has not been chaptered (i.e., "no" from 512), then the method continues at 502 to chapter the next photo in the photo sequence until the last photo is included in a last photo chapter.

If the last photo in the photo sequence has been included in a photo chapter (i.e., "yes" from 512), then at 514, a determination is made as to whether each photo chapter includes at least a minimum number of photos. For example, the photo analyzer 106 at the photo service 102 determines whether each photo chapter contains a single photo or a relatively small number of photos. If a photo chapter does not include at least a minimum number of photos (i.e., "no" from 514), then at 516, the photos in a photo chapter are added as a sub-chapter in either the previous photo chapter or the next photo chapter. For example, the photo analyzer 106 at the photo service 102 creates a sub-chapter of the photos in a photo chapter that does not include at least a minimum number of the photos, and adds the sub-chapter of photos to either the previous photo chapter or the next photo chapter. The method then continues at 514 to determine whether each photo chapter includes at least the minimum number of photos.

If the photo chapters do all include at least the minimum number of photos (i.e., "yes" from 514), then at 518, sub-chapters of photos that are included in each of the photo chapters can be created. For example, the photo analyzer 106 at the photo service 102 creates sub-chapters of photos that are included in a photo chapter if the respective timestamps of the photos are within a designated time duration of each other, such as photos that may have been taken within thirty minutes, or five minutes, of each other. The method can then continue at 412 in FIG. 4 to evaluate the number of photo chapters that have been created.

Figure 6:
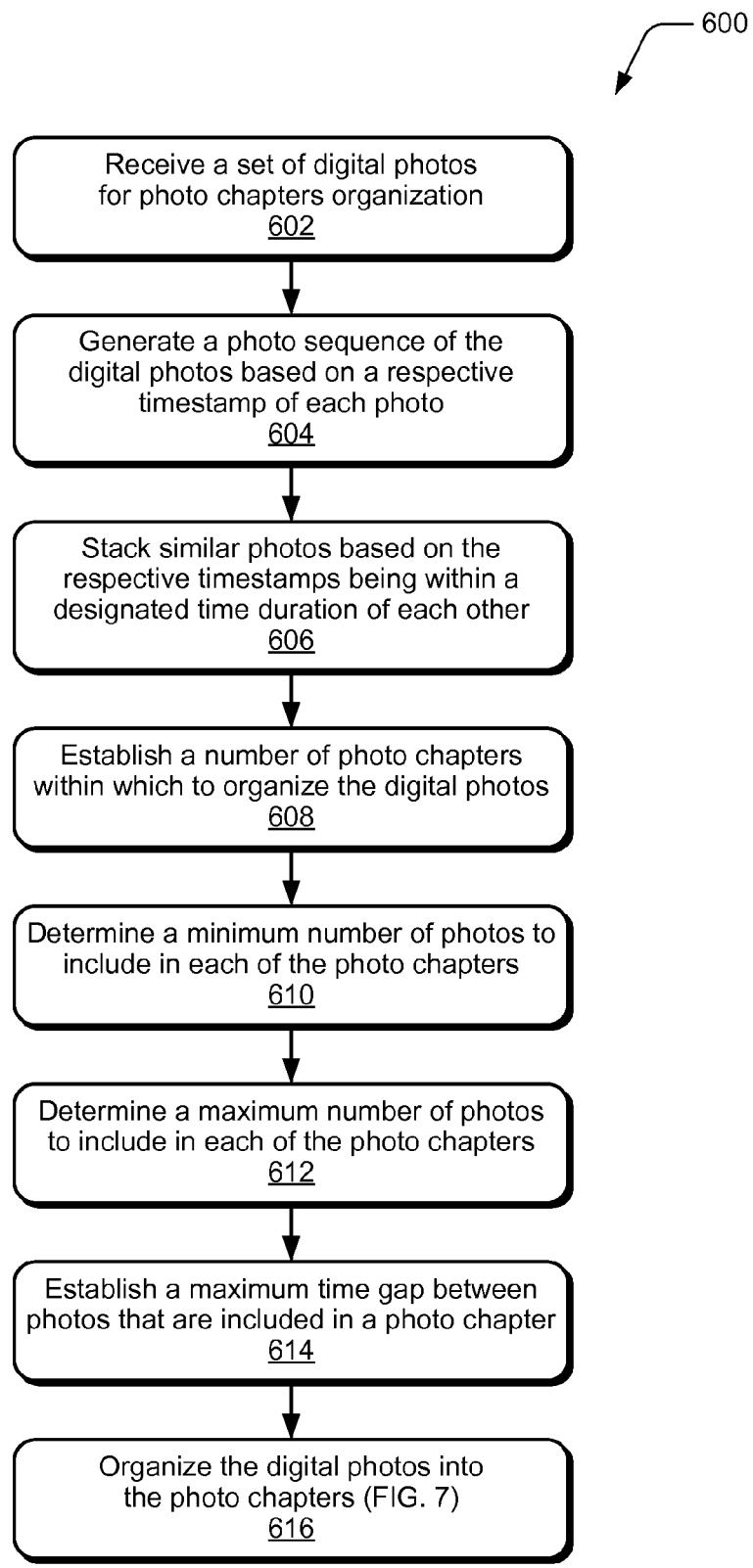
FIG. 6 illustrates example method(s) of photo chapters organization in accordance with one or more embodiments.

FIG. 6 illustrates example method(s) 600 of photo chapters organization, and is generally described with reference to a photo analyzer. The order in which the method is described is not intended to be construed as a limitation, and any number or combination of the method operations can be combined in any order to implement a method, or an alternate method.

At 602, a set of digital photos are received for photo chapters organization. For example, the photo analyzer 106 at the photo service 102 (FIG. 1) receives the set of digital photos 108 to analyze for photo chapters organization. Similarly, the client device 202 (FIG. 2) implements the photo analyzer 214 to perform any of the method operations described herein with reference to the photo analyzer 106 at the photo service 102.

At 604, a photo sequence of the digital photos is generated based on a respective timestamp of each photo. For example, the photo analyzer 106 at the photo service 102 generates the photo sequence 116 of the digital photos 108 based on the respective timestamps 324 (FIG. 3) for each photo to sort them by date and time, and the photo sequence includes a first photo based on an earliest timestamp and a last photo based on a latest timestamp.

At 606, similar photos are stacked based on the respective timestamps of the digital photos being within a designated time duration of each other. For example, the photo analyzer 106 at the photo service 102 stacks similar photos to create the stacks of similar photos 112 in the photo chapters 114. The similar photos can be determined based on photos that have respective timestamps within a designated time duration of each other, such as photos that may have been taken within a few seconds of each other. Alternatively or in addition, the photo analyzer analyzes the image content of each digital photo in a photo chapter and determines the similar photos based on the image content and metadata (e.g., the respective timestamps) of the photos. The photo analyzer then creates the stacks of similar photos in the photo chapters from these determined similar photos.

At 608, a number of photo chapters within which to organize the digital photos is established. For example, the photo analyzer 106 at the photo service 102 establishes a designated number of photo chapters to create, which can be based on the user-designated number 332 of photo chapters (e.g., a photo chapters parameter), based on the numerical range 334 of photo chapters, the calculated number 336 of photo chapters that is determined based on the quantity of the digital photos, and/or the time gap between photos parameter 338.

At 610, a minimum number of photos to include in each of the photo chapters is determined and, at 612, a maximum number of photos to include in each of the photo chapters is determined. For example, the photo analyzer 106 at the photo service 102 determines the minimum number of photos 108 to include in each of the photo chapters 114 based on the number of photo chapters and a quantity of the digital photos. The photo analyzer also determines the maximum number of photos to include in each of the photo chapters.

At 614, a maximum time gap between photos that are included in a photo chapter is established. For example, the photo analyzer 106 at the photo service 102 also establishes a maximum allowable time gap between photos that are included in a photo chapter. At 616, the digital photos are organized into the photo chapters. For example, the photo analyzer 106 at the photo service 102 organizes the digital photos into the photo chapters 114 as described with reference to FIG. 7 until all of the photos in the photo sequence 116 from the set of digital photos 108 are included in a photo chapter.

Figure 7:
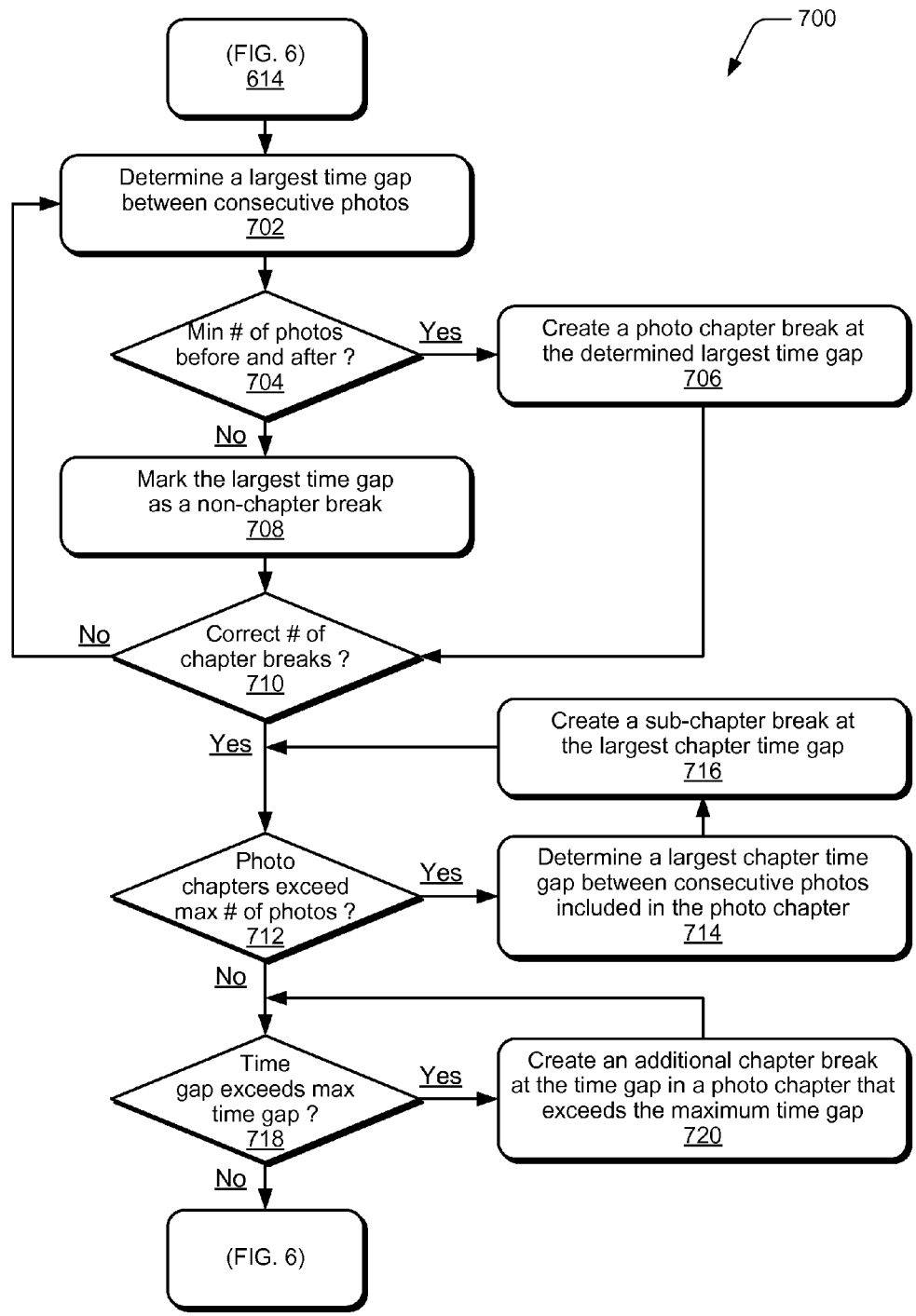
FIG. 7 further illustrates the example method(s) of FIG. 6 for photo chapters organization in accordance with one or more embodiments.

FIG. 7 illustrates example method(s) 700 of photo chapters organization, and is generally described with reference to a photo analyzer. The order in which the method is described is not intended to be construed as a limitation, and any number or combination of the method operations can be combined in any order to implement a method, or an alternate method.

At 702, a largest time gap between consecutive photos is determined. For example, the photo analyzer 106 at the photo service 102 (FIG. 1) determines the largest time gap between consecutive photos in the photo sequence 116 to organize the photos into the photo chapters 114 (as referred to at 616 in FIG. 6). A stack of similar photos is evaluated as a single photo having a start timestamp associated with a first photo in the stack and an end timestamp associated with a last photo in the stack. The client device 202 (FIG. 2) implements the photo analyzer 214 to perform any of the method operations described herein with reference to the photo analyzer 106 at the photo service 102.

At 704, a determination is made as to whether photo quantities before and after the largest time gap meets or exceeds the minimum number of included photos. For example, the photo analyzer 106 at the photo service 102 determines whether a photo quantity before the largest time gap (determined at 702) meets or exceeds the minimum number of included photos (determined at 610 in FIG. 6), and also whether a photo quantity after the largest time gap meets or exceeds the minimum number of included photos.

If the photo quantities before and after the largest time gap meets or exceeds the minimum number of included photos (i.e., "yes" from 704), then at 706, a photo chapter break is created at the determined largest time gap. For example, the photo analyzer 106 at the photo service 102 creates a photo chapter break at the determined largest time gap between consecutive photos in the photo sequence 116 if both the photo quantities before and after the largest time gap meets or exceeds the minimum number of included photos.

If the photo quantities before and after the largest time gap do not exceed the minimum number of included photos (i.e., "no" from 704), then at 708, the largest time gap is marked as a non-chapter break if either of the photo quantities is less than the minimum number of included photos. For example, the photo analyzer 106 at the photo service 102 marks the determined largest time gap between consecutive photos as a non-chapter break.

Continuing from the photo chapter break being created (at 706), or the largest time gap being marked as a non-chapter break (at 708), a determination is made at 710 as to whether the number of chapter breaks is one less than the established number of the photo chapters (e.g., a correct number of chapter breaks have been created). For example, the photo analyzer 106 at the photo service 102 determines whether the number of chapter breaks (created at 706) is one less than the established number of the photo chapters (established at 608 in FIG. 6). The number of chapter breaks will be one less than the number of photo chapters.

If the number of chapter breaks is not one less than the established number of the photo chapters (i.e., "no" from 710), then the method continues at 702 to determine the next largest time gap between consecutive photos in the photo sequence 116 to organize the digital photos into the photo chapters. If the number of chapter breaks is one less than the established number of the photo chapters (i.e., "yes" from 710), then a determination is made at 712 as to whether any of the photo chapters exceed the maximum number of included photos. For example, the photo analyzer 106 at the photo service 102 determines whether any of the photo chapters 114 exceed the maximum number of photos to be included in a photo chapter (determined at 612 in FIG. 6).

If a photo chapter exceeds the maximum number of included photos (i.e., "yes" from 712), then at 714, a largest chapter time gap between consecutive photos included in the photo chapter is determined. For example, the photo analyzer 106 at the photo service 102 determines the largest chapter time gap between consecutive photos included in the photo chapter. At 716, a sub-chapter break at the largest chapter time gap is created if the sub-chapter break results in sub-chapters that meet the minimum number of included photos determination. For example, the photo analyzer 106 creates the sub-chapter break at the largest chapter time gap determined in a photo chapter that exceeds the maximum number of included photos. The method then continues at 712 to determine whether any of the other photo chapters exceed the maximum number of photos.

If the photo chapters do not exceed the maximum number of included photos (i.e., "no" from 712), then a determination is made at 718 as to whether a time gap between consecutive included photos in a photo chapter exceeds the established maximum time gap. For example, the photo analyzer 106 at the photo service 102 determines whether a time gap between consecutive included photos in a photo chapter 114 exceeds the established maximum time gap (established at 614 in FIG. 6). If a time gap between consecutive included photos in a photo chapter exceeds the established maximum time gap (i.e., "yes" from 718), then at 720, an additional chapter break is created at the time gap in the photo chapter between the consecutive photos that are included in the photo chapter. For example, the photo analyzer 106 at the photo service 102 creates the additional chapter break at the time gap that exceeds the maximum allowable time gap.

The method then continues at 718 to determine whether any of the other photo chapters include a time gap between consecutive photos that exceeds the maximum allowable time gap. If the time gaps between photos in the photo chapters do not exceed the maximum time gap (i.e., "no" from 718), then the method can continue at FIG. 6 to further organize the digital photos into the photo chapters.

Figure 8:
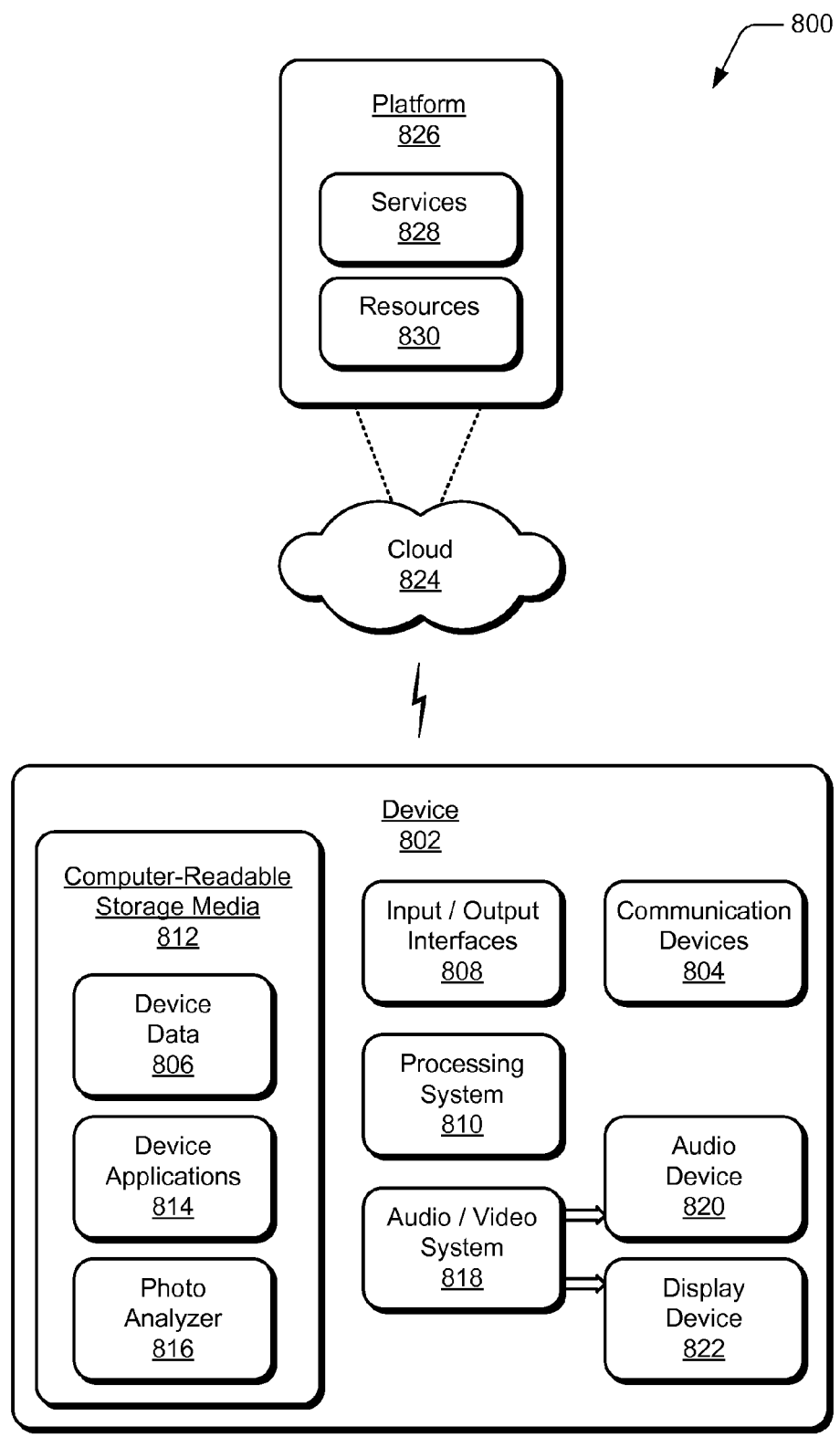
FIG. 8 illustrates an example system with an example device that can implement embodiments of photo chapters organization.

FIG. 8 illustrates an example system 800 that includes an example device 802, which can implement embodiments of photo chapters organization. The example device 802 can be implemented as any of the devices and/or services (e.g., server devices) described with reference to the previous FIGS. 1-7, such as any type of client device, mobile phone, tablet, computing, communication, entertainment, gaming, media playback, and/or other type of device. For example, the photo service 102 and/or the client device 202 shown in FIGS. 1 and 2 may be implemented as the example device 802.

The device 802 includes communication devices 804 that enable wired and/or wireless communication of device data 806, such as sets of photos, organized photo sets, and the viewer feedback that is collected and stored on the device. The device data can include any type of audio, video, and/or image data, as well as collected data. The communication devices 804 can also include transceivers for cellular phone communication and/or for network data communication.

The device 802 also includes input/output (I/O) interfaces 808, such as data network interfaces that provide connection and/or communication links between the device, data networks, and other devices. The I/O interfaces can be used to couple the device to any type of components, peripherals, and/or accessory devices, such as a digital camera device that may be integrated with device 802. The I/O interfaces also include data input ports via which any type of data, media content, and/or inputs can be received, such as user inputs to the device, as well as any type of audio, video, and/or image data received from any content and/or data source.

The device 802 includes a processing system 810 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The device 802 also includes computer-readable storage media 812, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 812 provides storage of the device data 806 and various device applications 814, such as an operating system that is maintained as a software application with the computer-readable storage media and executed by the processing system 810. In this example, the device applications also include a photo analyzer 816 that implements embodiments of photo chapters organization, such as when the example device 802 is implemented as the client device 202 shown in FIG. 2. Examples of the photo analyzer 816 include the photo analyzer 106 implemented at the photo service 102, the photo analyzer 214 implemented by the client device 202, and/or the photo analyzer 300, as described with reference to FIGS. 1-3.

The device 802 also includes an audio and/or video system 818 that generates audio data for an audio device 820 and/or generates display data for a display device 822. The audio device and/or the display device include any devices that process, display, and/or otherwise render audio, video, display, and/or image data, such as the image content of a digital photo. In implementations, the audio device and/or the display device are integrated components of the example device 802. Alternatively, the audio device and/or the display device are external, peripheral components to the example device.

In embodiments, at least part of the techniques described for photo chapters organization may be implemented in a distributed system, such as over a "cloud" 824 in a platform 826. The cloud 824 includes and/or is representative of the platform 826 for services 828 and/or resources 830. For example, the services 828 may include the photo service 102 described with reference to FIGS. 1 and 2. Additionally, the resources 830 may include the photo analyzer 106 that is implemented at the photo service as described with reference to FIGS. 1 and 2.

The platform 826 abstracts underlying functionality of hardware, such as server devices (e.g., included in the services 828) and/or software resources (e.g., included as the resources 830), and connects the example device 802 with other devices, servers, etc. The resources 830 may also include applications and/or data that can be utilized while computer processing is executed on servers that are remote from the example device 802. Additionally, the services 828 and/or the resources 830 may facilitate subscriber network services, such as over the Internet, a cellular network, or Wi-Fi network. The platform 826 may also serve to abstract and scale resources to service a demand for the resources 830 that are implemented via the platform, such as in an interconnected device embodiment with functionality distributed throughout the system 800. For example, the functionality may be implemented in part at the example device 802 as well as via the platform 826 that abstracts the functionality of the cloud 824.

Although embodiments of photo chapters organization have been described in language specific to features and/or methods, the appended claims are not necessarily limited to the specific features or methods described. Rather, the specific features and methods are disclosed as example implementations of photo chapters organization.

The invention claimed is:

1. A method, comprising:
   receiving a set of digital photos;
   establishing a number of photo chapters within which to organize the digital photos;
   determining a minimum number of the digital photos to include in each of the photo chapters based on the number of photo chapters and a quantity of the digital photos;
   organizing the digital photos into the photo chapters based on:
   determining a largest time gap between consecutive photos;
   determining whether a first photo quantity before the largest time gap exceeds the minimum number of included photos and whether a second photo quantity after the largest time gap exceeds the minimum number of included photos; and one of:
   creating a chapter break at the largest time gap if both the first and second photo quantities exceed the minimum number of included photos; or marking the largest time gap as a non-chapter break if either of the first or second photo quantities is less than the minimum number of included photos; and repeating said organizing the digital photos into the photo chapters until a number of chapter breaks is one less than the established number of the photo chapters.

2. A method as recited in claim 1, further comprising:

generating a photo sequence of the digital photos based on a respective timestamp of each digital photo; and stacking similar photos based on the respective timestamps of the digital photos being within a designated time duration of each other.

3. A method as recited in claim 2, wherein said determining a largest time gap between consecutive photos includes evaluating a stack of similar photos as a single photo having a start timestamp associated with a first photo in the stack and an end timestamp associated with a last photo in the stack.

4. A method as recited in claim 1, further comprising:

determining a maximum number of included photos in each of the photo chapters;

determining a photo chapter that exceeds the maximum number of included photos;

determining a largest chapter time gap between consecutive included photos in the photo chapter; and creating a sub-chapter break at the largest chapter time gap if both a first sub chapter photo quantity before the largest chapter time gap exceeds the minimum number of included photos and if a second sub-chapter photo quantity after the largest chapter time gap exceeds the minimum number of included photos.

5. A method as recited in claim 4, further comprising:

determining a sub-chapter of a photo chapter that exceeds the maximum number of included photos;

determining a largest sub-chapter time gap between consecutive sub-chapter included photos; and creating an additional sub-chapter break at the largest sub-chapter time gap if both the first and second sub-chapter photo quantities before and after the largest sub chapter time gap exceeds the minimum number of included photos.

6. A method as recited in claim 1, further comprising:

establishing a maximum time gap between included photos in a photo chapter;

determining that a time gap between consecutive included photos in the photo chapter exceeds the established maximum time gap; and creating an additional chapter break at the time gap between the consecutive included photos in the photo chapter.

7. A computing system, comprising: a processing system to implement a photo analyzer that is configured to: establish a number of photo chapters within which to organize digital photos;

determine a minimum number of the digital photos to include in each of the photo chapters based on the number of photo chapters and a quantity of the digital photos;

organize the digital photos into the photo chapters based on the photo analyzer configured to:

determine a largest time gap between consecutive photos;

determine whether a first photo quantity before the largest time gap exceeds the minimum number of included photos and whether a second photo quantity after the largest time gap exceeds the minimum number of included photos; and one of:

create a chapter break at the largest time gap if both the first and second photo quantities exceed the minimum number of included photos; or mark the largest time gap as a non-chapter break if either of the first or second photo quantities is less than the minimum number of included photos; and repeat to said organize the digital photos into the photo chapters until a number of the chapter breaks is one less than the established number of the photo chapters.

8. The computing system as recited in claim 7, wherein the photo analyzer is configured to:

generate a photo sequence of the digital photos based on a respective timestamp of each digital photo; and stack similar photos based on the respective timestamps of the digital photos being within a designated time duration of each other.

9. The computing system as recited in claim 8, wherein the photo analyzer is configured to said determine the largest time gap between consecutive photos by evaluation of a stack of similar photos as a single photo having a start timestamp associated with a first photo in the stack and an end timestamp associated with a last photo in the stack.

10. The computing system as recited in claim 7, wherein the photo analyzer is configured to:

determine a maximum number of included photos in each of the photo chapters;

determine a photo chapter that exceeds the maximum number of included photos;

determine a largest chapter time gap between consecutive included photos in the photo chapter; and create a sub-chapter break at the largest chapter time gap if both a first sub-chapter photo quantity before the largest chapter time gap exceeds the minimum number of included photos and if a second sub-chapter photo quantity after the largest chapter time gap exceeds the minimum number of included photos.

11. The computing system as recited in claim 10, wherein the photo analyzer is configured to: determine a sub-chapter of a photo chapter that exceeds the maximum number of included photos;

determine a largest sub-chapter time gap between consecutive sub-chapter included photos; and create an additional sub-chapter break at the largest sub-chapter time gap if both the first and second sub-chapter photo quantities before and after the largest sub-chapter time gap exceeds the minimum number of included photos.

12. The computing system as recited in claim 7, wherein the photo analyzer is configured to:

establish a maximum time gap between included photos in a photo chapter;

determine that a time gap between consecutive included photos in the photo chapter exceeds the established maximum time gap; and create an additional chapter break at the time gap between the consecutive included photos in the photo chapter.

13. A computer-readable storage memory device comprising a photo analyzer stored as instructions that are executable and, responsive to execution of the instructions by a computing device, the computing device performs operations comprising: establish a number of photo chapters within which to organize digital photos; determine a minimum number of the digital photos to include in each of the photo chapters based on the number of photo chapters and a quantity of the digital photos; organize the digital photos into the photo chapters based on the photo analyzer configured to: determine a largest time gap between consecutive photos; determine whether a first photo quantity before the largest time gap exceeds the minimum number of included photos and whether a second photo quantity after the largest time gap exceeds the minimum number of included photos; and one of: create a chapter break at the largest time gap if both the first and second photo quantities exceed the minimum number of included photos; or mark the largest time gap as a non-chapter break if either of the first or second photo quantities is less than the minimum number of included photos; and repeat to organize the digital photos into the photo chapters until a number of the chapter breaks is one less than the established number of the photo chapters.

14. The computer-readable storage memory device as recited in claim 13, wherein the computing device performs the operations of the photo analyzer further comprising to:

generate a photo sequence of the digital photos based on a respective timestamp of each digital photo; and stack similar photos based on the respective timestamps of the digital photos being within a designated time duration of each other.

15. The computer-readable storage memory device as recited in claim 14, wherein the computing device performs the operations of the photo analyzer further comprising to:

said determine the largest time gap between consecutive photos by evaluation of a stack of similar photos as a single photo having a start timestamp associated with a first photo in the stack and an end timestamp associated with a last photo in the stack.

16. The computer-readable storage memory device as recited in claim 13, wherein the computing device performs the operations of the photo analyzer further comprising to:

determine a maximum number of included photos in each of the photo chapters;

determine a photo chapter that exceeds the maximum number of included photos;

determine a largest chapter time gap between consecutive included photos in the photo chapter; and create a sub-chapter break at the largest chapter time gap if both a first sub-chapter photo quantity before the largest chapter time gap exceeds the minimum number of included photos and if a second sub-chapter photo quantity after the largest chapter time gap exceeds the minimum number of included photos.

17. The computer-readable storage memory device as recited in claim 16, wherein the computing device performs the operations of the photo analyzer further comprising to: determine a sub-chapter of a photo chapter that exceeds the maximum number of included photos; determine a largest sub-chapter time gap between consecutive sub-chapter included photos; and create an additional sub-chapter break at the largest sub-chapter time gap if both the first and second sub-chapter photo quantities before and after the largest sub-chapter time gap exceeds the minimum number of included photos.

18. The computer-readable storage memory device as recited in claim 13, wherein the computing device performs the operations of the photo analyzer further comprising to:

establish a maximum time gap between included photos in a photo chapter;

determine that a time gap between consecutive included photos in the photo chapter exceeds the established maximum time gap; and create an additional chapter break at the time gap between the consecutive included photos in the photo chapter.

* * * * *